T. B. McCaughan,
Fish Trap,
No. 76,489. Patented Apr. 7, 1868.
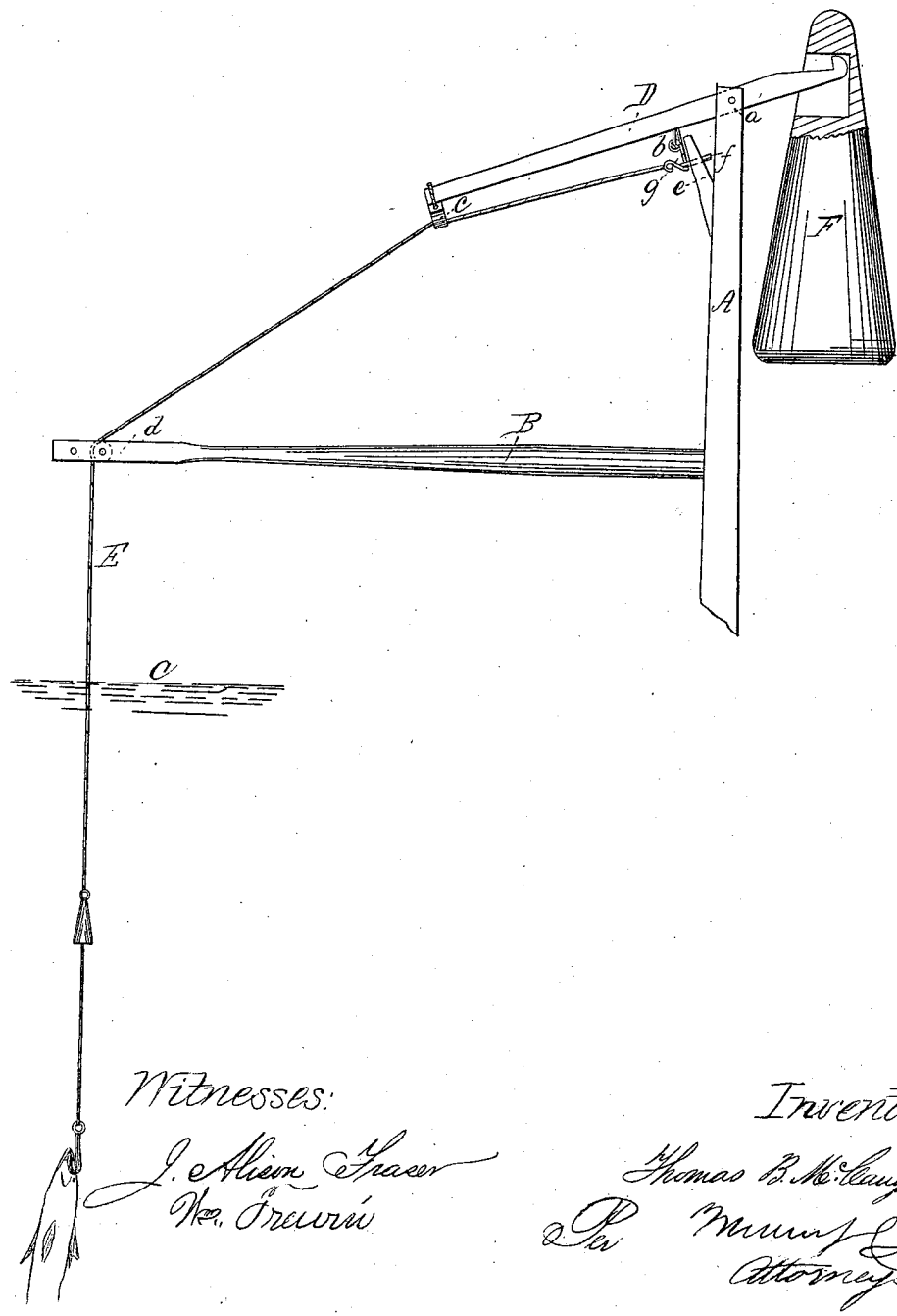

United States Patent Office.

THOMAS B. McCAUGHAN, OF MOSCOW, TENNESSEE.

Letters Patent No. 76,489, dated April 7, 1868.

IMPROVED FISH-TRAP.

*The Schedule referred to in these Letters Patent and making part of the same.*

TO ALL WHOM IT MAY CONCERN:

Be it known that I, THOMAS B. McCAUGHAN, of Moscow, in the county of Fayette, and State of Tennessee, have invented a new and improved Fish-Trap; and I do hereby declare that the following is a full, clear, and exact description thereof, which will enable others skilled in the art to make and use the same, reference being had to the accompanying drawings, forming part of this specification.

This invention relates to a new and improved device for catching or hooking fish, and is designed to be used in connection with a set-line.

It is a common practice with fishermen in many localities to bait hooks and have the lines attached to a pole or rod sunk into the bed of the river or creek, or into the bank at the side of the same, the lines being visited at suitable intervals, and the fish, if any be caught, drawn out of the water, the hooks rebaited, and again thrown into the stream or creek. The fish very frequently succeed in taking the bait from the hooks of these set-lines without being hooked, on account of the absence of any jerk or pull when they seize the bait; and the object of the present invention is to overcome that objection attending the use of set-lines.

The accompanying drawing represents a side view of my invention.

A represents an upright, which may be driven or sunk into the bed of a river or creek, or into the bank at the side of the same, and B is a horizontal pole, framed into the upright, A, and projecting over the river or stream C. In the upper end of the upright, A, there is secured, by a fulcrum-pin, $a$, a lever, D, the long arm of which projects over the pole B, and has a fish-line, E, attached to it at the point $b$, near the upright, A, the fish-line passing through an eye, $c$, at the end of the long arm of the lever D, over a pulley, $d$, in the outer end of the pole B, and then extending down into the water a suitable depth, the line being provided with the usual hooks and sinker. The upright, A, has a small bracket, $e$, attached to it near its upper end, through which a pin, $f$, passes, and the fish-line E is attached to the lever D by means of a bent or V-shaped rod, $g$. The inner short arm of the lever D has a weight, F, suspended upon it, and in setting the line the bent rod $g$ is placed under the pin $f$, and the weight F thereby sustained.

In the drawing, the line is represented set, or ready to operate in hooking a fish when the latter seizes the bait. The fish, in grasping the bait, pulls the bent rod $g$ off from the pin $f$ in bracket $e$, thereby liberating the lever D, and allowing the weight F to suddenly throw up the long arm of the lever D, and the line is jerked or drawn suddenly upward, and the fish hooked.

This device may be constructed by almost any one of ordinary ability at a very small cost.

I claim as new, and desire to secure by Letters Patent—

The loaded or weighted lever D at the upper end of the upright, A, in connection with the horizontal pole B, line E, and the bent rod $g$ and pin $f$, or their equivalents, all arranged substantially as and for the purpose herein set forth.

THOS. B. McCAUGHAN,

Witnesses:
 CHAS. A. McCAUGHAN,
 R. B. STOVER.